Nov. 22, 1966 E. M. STOLARZ 3,286,916
COUNTER AND CRYSTAL ASSEMBLY THEREFOR
Original Filed June 17, 1963
2 Sheets-Sheet 1
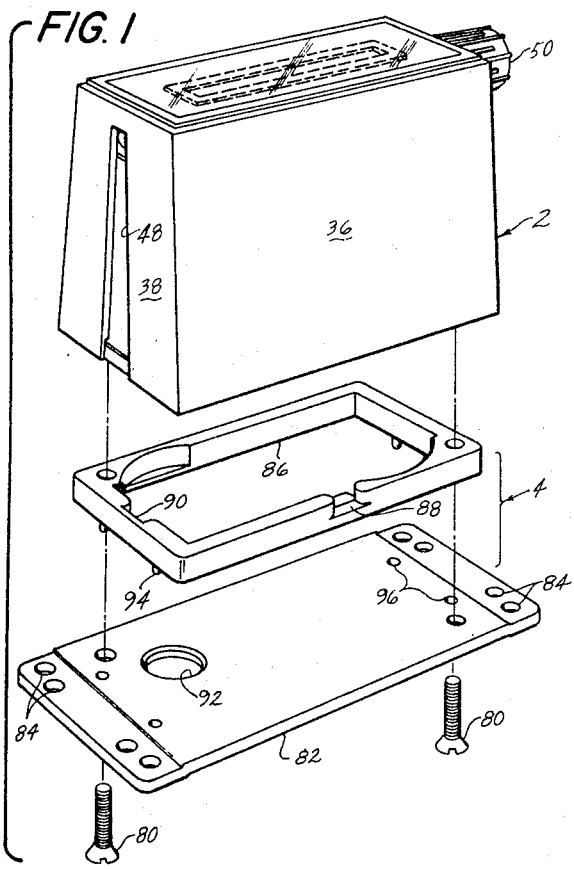
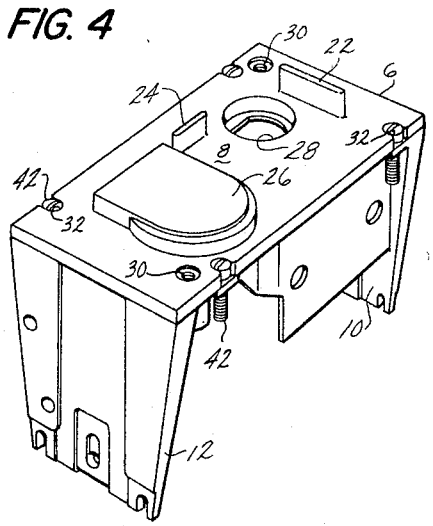
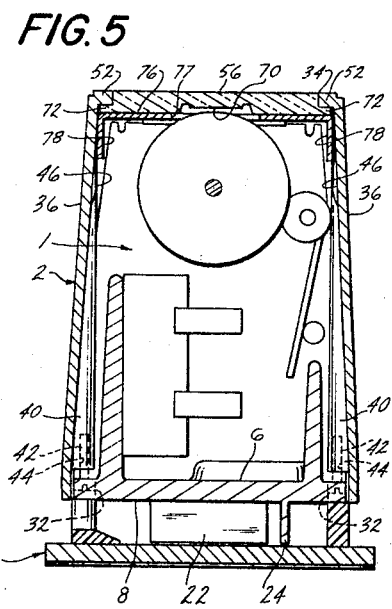
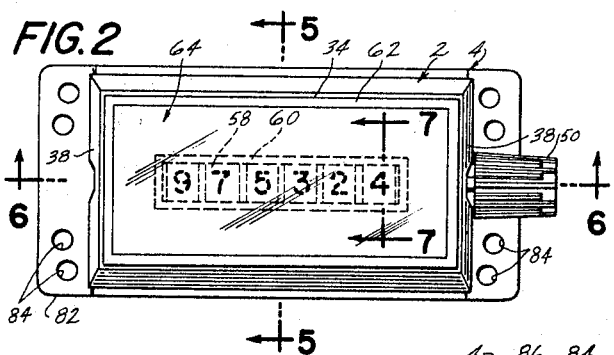
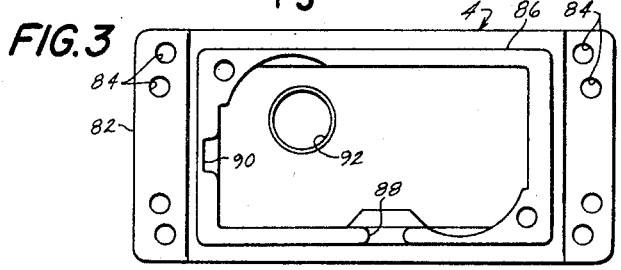
INVENTOR.
EDWARD M. STOLARZ
BY
ATTORNEY Nov. 22, 1966   E. M. STOLARZ   3,286,916
COUNTER AND CRYSTAL ASSEMBLY THEREFOR
Original Filed June 17, 1963   2 Sheets-Sheet 2

INVENTOR.
EDWARD M. STOLARZ
BY
*Peter L. Costas*
ATTORNEY

United States Patent Office 3,286,916
Patented Nov. 22, 1966

3,286,916
COUNTER AND CRYSTAL ASSEMBLY THEREFOR
Edward M. Stolarz, New York, N.Y., assignor to Redington Counters, Inc., Windsor, Conn., a corporation of Connecticut
Original application June 17, 1963, Ser. No. 288,091, now Patent No. 3,219,268, dated Nov. 23, 1965. Divided and this application Feb. 26, 1965, Ser. No. 435,648
7 Claims. (Cl. 235—1)

This application is a division of my copending United States application Serial Number 288,091 filed June 17, 1963, entitled Counter and Casing Assembly Therefor, now United States Patent No. 3,219,268 granted November 23, 1965.

The present invention relates to counters and like indicating devices and to a novel crystal assembly in the casing thereof.

It is an object of the present invention to provide a counter and like indicating devices having a novel and highly attractive casing assembly which provides a target frame about the number wheels for directing the eye of a reader to the numbers.

Another object is to provide a counter having a casing assembly with cover and base members which cooperate with the counting mechanism frame member to support a transparent crystal and space the upper portions of the number wheels in close proximity to the upper surface of the crystal.

Other objects and advantages will be apparent from the following detailed specification and the attached drawings wherein:

FIGURE 1 is a partially exploded perspective view of a counter embodying the present invention with the counter mechanism unremoved from the cover for clarity of illustration;

FIGURE 2 is a plan view of the counter of FIGURE 1, the numbers and wheels being shown in phantom lines;

FIGURE 3 is a plan view of the base member of the counter of FIGURE 1;

FIGURE 4 is a bottom perspective view of the frame member of the counter of FIGURE 1;

FIGURE 5 is a sectional view along the line 5—5 of FIGURE 2;

Figure 6:
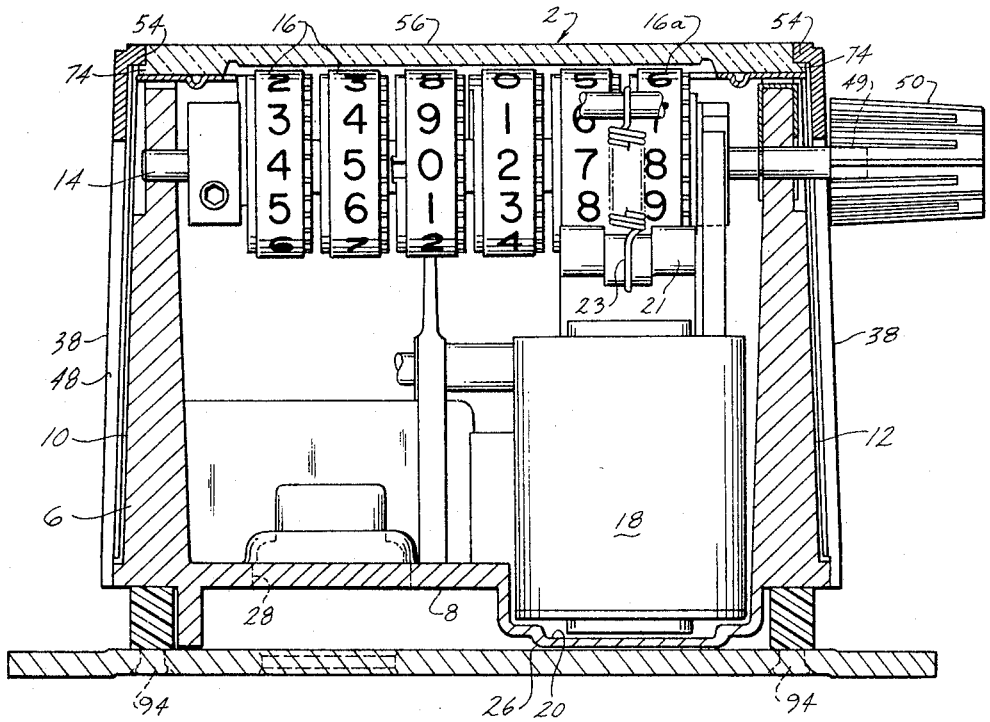
FIGURE 6 is a sectional view to an enlarged scale along the line 6—6 of FIGURE 2.

It has been found that the foregoing and related objects may be readily attained by a counter employing a counting mechanism having a frame member, a number wheel shaft journaled in the upper portion of the frame member, a plurality of number wheels rotatably mounted on the shaft and means for actuating the number wheels. The frame member is received within a casing assembly having a cover member which encloses the frame member and the bulk of the counting mechanism. The cover member has a top wall portion extending over the top of the frame member and side and end wall portions extending about the sides and ends of the frame member. The top wall portion has a transparent window area registering with the number wheels and having its margins spaced inwardly from the margins of the top wall portion, the area therebetween being relatively opaque. A coating or other suitable means is provided to outline conspicuously the margins of the window area with respect to the top wall portion thereabout and thus to provide a target frame about the window area and the portion of the number wheels visible through the window area.

In the preferred form, the top wall portion and the window portion therein are both outlined with bright metallic margins to guide the eye of a reader inwardly to the numbers framed within the window portion. The upper surface of the top wall portion is substantially planar and provides a dark, opaque spacing between the outer and inner margins, thus rendering the margins more conspicuous and providing freedom from distraction as the eye is directed to and fixed upon the numbers. The target frame thus provided is extremely effective in drawing the eye of a reader to the numbers framed therein for rapid, accurate and facile reading.

The casing assembly permits the introduction of lead wires at a plurality of spaced points thereabout and desirably provides a substantially dirt-proof, tamper-resistant assembly. In addition, the casing assembly dimensionally cooperates with the counting mechanism to space the upper portions of the number wheels in close proximity to the window area to provide a wide angle of sight.

The top wall portion of the casing includes a crystal member of transparent synthetic plastic material providing the major part thereof including the window area, and the margins of the window area are outlined with relatively light material with the area between the margins of the window area and the margins of the crystal member having applied thereto a relatively dark and relatively opaque material to accentuate the target frame. The lower surface of the crystal member most desirably has a recess therein substantially registering with the window area which receives the uppermost portions of the number wheels to permit them to rotate therein with the periphery of each wheel in closer proximity to the upper surface of the top wall portion to provide a wider angle of sight. In this manner, a relatively thick and rugged crystal member may be utilized as a unitary top wall portion while also providing a good cone of vision.

Referring now in detail to the drawings, therein is illustrated a counter embodying the present invention and generally comprised of a counting mechanism 1 and a casing assembly therefor provided by a cover member generally designated by the number 2 and a base member generally designated by the number 4.

The counting mechanism 1 has a frame member 6 having a bottom portion 8 and generally vertically extending end portions 10, 12. Journaled in the upper portion of the frame member 6 is a number wheel shaft 14 on which a plurality of number wheels 16 are rotatably mounted so that their uppermost portions extend upwardly of the upper margins of the frame member 6. Also supported in the frame member 6 is means for actuating the number wheels 16 including the electromagnet 18 shown in FIGURE 6 which is received in a recess 20 in the upper surface of the bottom portion 8 of the frame member 6. Electrical impulses to the electromagnet 18 through a lead wire (not shown) pivot the clapper 21 against the biasing pressure of the spring 23 and thereby rotate the unit number wheel 16a about an increment of rotation, as is conventional.

Depending from the bottom portion 8 are baffle portions 22, 24 and the baffle-like projection 26 formed by the bottom surface of the bottom portion 8 about the recess 20, all for a purpose to be described hereinafter. The bottom portion 8 is provided with a relatively large aperture 28 for introducing a lead wire (not shown) into the counting mechanism, a pair of threaded apertures 30 and four recessed apertures 32.

Snugly fitted over the frame member 6 is the cover member 2 having a top wall portion 34 extending over the top of the frame member 6 and side wall portions 36 and end wall portions 38 extending, respectively, about the end portions 10, 12 of the frame member 6 and therebetween. The side wall portions 36 are provided with inwardly projecting bosses 40, having threaded apertures 44 in the bottom thereof, and the frame member 6 is dimensioned to fit sungly within the cover member 2 for a firm, relatively dirt-proof seal. Detachably securing the cover member 2 to the frame member 6 are threaded fasteners 42 which extend upwardly through the recssed apertures 32 into threaded apertures 44 in the bosses 40 registering therewith.

The side wall portions 36 of the cover member 2 are also provided with small bosses 46 adjacent the upper edges thereof for a purpose described hereinafter. The end wall portions 38 are provided with generally vertically extending, elongated slots 48 opening on the bottom edge thereof to enable the cover member 2 to be conveniently slipped over the frame member 6 when the number wheel shaft 14 has an outwardly extending portion 49 such as that portion mounting the reset knob 50. The end portions 10, 12 of the frame member 6 cooperate with the end wall portions 38 of the cover member 2 to prevent substantially the passage of contaminants through the slots 48 in the assembled counter. Inwardly projecting flange portions 52, 54 are provided at the upper edges of the side wall portions 36 and end wall portions 38 which serve a function to be described hereinafter.

Figure 7:
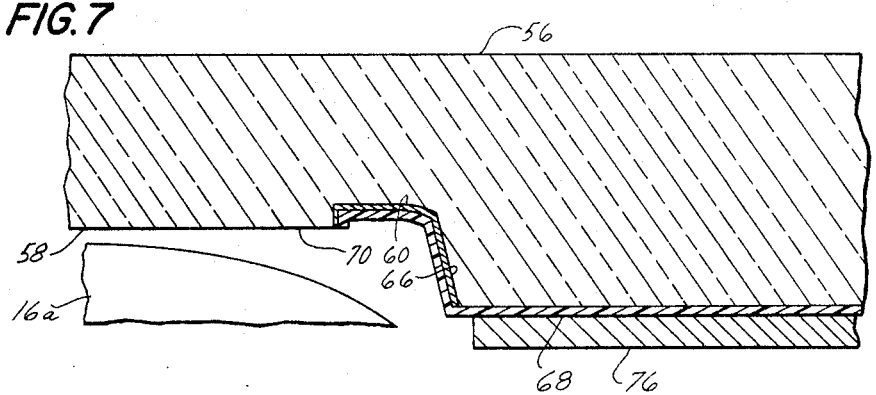
FIGURE 7 is a fragmentary sectional view to an enlarged scale along the line 7—7 of FIGURE 2.

The top wall portion 34 of the cover member 2 is comprised in its major part of a crystal member 56 of transparent synthetic plastic material with a substantially planar upper surface which provides a transparent window area 58 generally centered therein and registering with the number wheels 16 as shown in FIGURES 2, 5 and 6. Most desirably, the window area 58 has its margins 60 oriented generally parallel to the corresponding margins 62 of the top wall portion 34 provided by the upper surface of the flange portions 52, 54, and the margins 60, 62 are conspicuously outlined with respect to the area therebetween, to provide a target frame generally designated by the numeral 64 about the window area 58 and the numbers visible through the window area 58 so as to direct the eye of a reader to the numbers for rapid and accurate reading. To maximize the effect of the target frame 64, the margins 60 are outlined with a light or brightly colored material such as metallized aluminum coating on the inner surface of the crystal 66 and the area of the crystal between the margins 60, 62 has applied thereto a relatively dark and relatively opaque material 68 as seen in FIGURE 7. The metal of the flange portions 52, 54 providing the remainder of the top wall portion 34 and defining its margins 62 has a bright metallic finish to accentuate the frame target 64 still further.

Most desirably, crystal 56 is provided with a recess 70 corresponding generally to the window area 58 and dimensioned to receive therein the uppermost portions of the number wheels 16 to permit them to rotate therein with the periphery of each wheel in close proximity to the upper surface of the top wall portion 34, thus widening the effective angle of vision.

The crystal member 56 is provided with flange portions 72, 74 projecting outwardly from side edges adjacent its lower surface which cooperate with the flange portions 52, 54 of the cover member 2 to limit the outward movement of the crystal member 56 with respect to the cover member 2 as seen in FIGURES 5 and 6. Proper dimensioning of the thickness of all flange portions, as seen in FIGURES 5 and 6, locates the top surfaces of the crystal member 56 and the flanges 52, 54 in a substantially common plane to provide the highly desired planar surface to the top wall portion 34 defined thereby.

Fitted under and lending support to the crystal member 56 is the crystal retaining member 76 which has an aperture 77 therein somewhat larger than and registering with the window area 58. The end portions 10, 12 of the frame member 6 are vertically dimensioned to locate the crystal retainer 76 and the crystal supported thereon with the flanges 72, 74 of the crystal 56 in abutment against the flanges 52, 54 and with the retaining member 76 reinforcing the crystal member 56 interposed between the end portions 10, 12 and the crystal 56. The crystal member 56, crystal retaining member 76, and the frame member end portions 10, 12 are cooperatively dimensioned so that they will snugly interfit within the cover member 2 and the crystal member recess 70 will receive the uppermost portions of the number wheels 16 extending upwardly of the upper margins of the frame member 6. The retaining member 76 is provided with depending flange portions 78 which are lightly bent outwardly and cammed inwardly during insertion to resiliently bear against and frictionally lock with the small bosses 46, giving limited support to the crystal member 56 when the frame member 6 is removed from the cover member 2.

The base member 4 underlies the frame member 6 and is detachably secured thereto by threaded fasteners 80 which extend upwardly through apertures in the base member 4 and are received in the apertures 30, blocking access to the fasteners 42 to discourage removal of the fasteners 42 and tampering with the counter mechanism 1. The base member 4 includes a base element 82 adapted to be secured to a mounting surface as by fasteners through the mounting apertures 84, and a pedestal or sub-base element 86 interposed between the base element 82 and the frame member 6. The sub-base element 86 is provided with the lead wire aperture 88 and a knockout 90 of reduced thickness, and the base element 82 is provided with the lead wire aperture 92, and the elements 82, 86 cooperate to provide a base member 4 which permits the introduction of a lead wire into the casing assembly through a plurality of points spaced thereabout.

The baffle portions 22, 24 and the projection 26 depending from the bottom portion 8 of the frame member 6 are adapted to cooperate with the configuration of the base member 4 to retard the passage of contaminating agents through the points of introduction of the lead wire into the casing assembly. Integral rivets 94 on the sub-base element 86 extend into the apertures 96 of the base element 82 to seat it securely upon the upper surface thereof. Where desired, the sub-base element 86 may be easily detached from the base element 82, and the counter may be secured to a mounting surface by passing the threaded fasteners 80 through apertures in a mounting surface and through the apertures in the sub-base element 86 for detachable engagement in the threaded apertures 30 of the frame member 6, thus necessitating access to the underside of a mounting surface before gaining access to the fasteners 42 to discourage further any tampering with the counting mechanism.

The cover member is conveniently cast from zinc or aluminum alloys or other metals which may be brightened easily to provide a light colored margin for the top wall portion, or it may be injection molded of suitably rugged thermoplastic material. For rigidity and close tolerance, the frame member may be economically die cast from the same alloy as the cover member to minimize electrolytic corrosion.

The crystal member may be readily injection molded from thermoplastic material having satisfactory optical properties such as styrene-acrylonitrile, polycarbonate, acrylics, vinylidene chloride and polystyrene. The margins of the window area most desirably are vacuum metallized with aluminum to produce an appearance similar to that of the brightened metallic margins of the top wall portion. The lower surface of the crystal member between the margins of the window area and the margins of the top wall portion may be coated with a relatively opaque lacquer or paint, such as matte black or charcoal finish, to produce a highly effective target frame, and this coating desirably extends over the metallized coating to provide protection therefor.

The sub-base element is conveniently injection molded of polyethylene or nylon which may be readily machined to provide alternate points of introduction for the lead wire. The base element is desirably and economically stamped from metal sheet for rigidity and strength.

Thus, it can be seen that the present invention provides a counter having a novel and highly attractive casing assembly with a novel and highly effective target frame about the number wheels to direct the eye of a reader to the numbers for rapid and accurate reading. The cover and base members cooperate with the counting mechanism to support and reinforce the crystal member and to space the number wheels in close proximity to the upper surface of the crystal to afford a wide angle of sight.

Having thus described the invention, I claim:

1. A counter comprising a counting mechanism having a frame member, a number wheel shaft journaled in the upper portion of said frame member, a plurality of number wheels rotatably mounted on said shaft and having their uppermost portions extending upwardly of the upper margins of said frame member, and means for actuating said number wheels; and a casing assembly in which said frame is received, said casing assembly having a cover member with a top wall portion extending over the top of said frame member and side and end wall portions extending about the sides and ends of said frame member, said top wall portion having a planar upper surface and being comprised in its major part of a crystal member having a transparent window area therein registering with said number wheels, said crystal member having a recess in the lower surface thereof substantially coinciding with said window area and receiving the uppermost portions of said number wheels to permit said number wheels to rotate therein with the periphery of each wheel in close proximity to the upper surface of said top wall portion to provide a wide angle of sight, said window area having its margins spaced inwardly from the margins of said top wall portion with the area therebetween being relatively opaque, means conspicuously outlining the margins of said window area to provide a target frame about the window area and the portion of said number wheels visible through said window area for directing the eye of a reader to the numbers for rapid and accurate reading, and means supporting said crystal member in said cover member.

2. The counter of claim 1 wherein said crystal member is fabricated from transparent synthetic plastic material with the margins of said window area being outlined with relatively light colored material and the area between the margins of said window area and the margins of the crystal member having applied thereto a relatively dark and relatively opaque material to provide a target frame about the window area and the visible portion of the wheels.

3. The counter of claim 1 wherein said means supporting said cover member within said cover member includes a crystal retaining member engaged frictionally with the wall portions of said cover member adjacent the upper edges thereof to give support to said crystal member, said retaining member having an aperture therein generally coinciding with said window area, and wherein said side and end wall portions of said cover member have inwardly projecting flange portions adjacent their upper edges and the margins of said crystal have outwardly projecting flange portions adjacent the inner surface thereof for engagement with the flange portions on said side and end wall portions of said cover member to limit the outward movement of said crystal with respect to said cover member.

4. A counter comprising a counting mechanism having a frame member, a number wheel shaft journaled in the upper portion of said frame member, a plurality of number wheels rotatably mounted on said nhaft and having their uppermost portions extending above the upper margins of said frame member, and means for actuating said number wheels; and a casing assembly in which said frame is received having a cover member with a top wall portion extending over the top of said frame member and side and end wall portions extending about the sides and ends of said frame member, said top wall portion having a substantially planar upper surface and being comprised in its major part of a crystal member of transparent synthetic plastic material, said crystal member having a transparent window area generally centered therein and registering with said number wheels, said window area having its margins disposed generally parallel to the corresponding margins of said top wall portion and spaced inwardly therefrom with the area therebetween being relatively opaque, and means on said crystal member conspicuously outlining the margins of said window area with respect to the top wall portion thereabout to provide a target frame about the window area and the portion of said number wheels visible therethrough for directing the eye of a reader to the numbers for rapid and accurate reading, said frame member supporting said crystal member in said cover member, said crystal member having a recess in the lower surface thereof substantially coinciding with said window area and receiving the uppermost portions of said number wheels and permitting said number wheels to rotate in close proximity to the upper surface of said crystal member to provide a wide angle of sight.

5. The counter of claim 4 wherein said margins of said window area are outlined with relatively light colored material and the area between the margins of said window area and the margins of said top wall portion has applied thereto a relatively dark and relatively opaque material.

6. The counter of claim 4 wherein said side and end wall portions of said cover member have inwardly projecting flange portions adjacent their upper edges and the margins of said crystal member have outwardly projecting flange portions adjacent the lower surface thereof for engagement with the flange portions on said side and end wall portions of said cover member to limit the outward movement of said crystal with respect to said cover member, and wherein said casing assembly includes a crystal retaining member engaged frictionally with the wall portions of said cover member adjacent the upper edges thereof to give support to said crystal member, said retaining member having an aperture therein generally registering with said window area.

7. A counter comprising a counting mechanism having a frame member with a bottom portion and generally vertically extending end portions, a number wheel shaft journaled in the upper portion of said end portions of said frame member, a plurality of number wheels rotatably mounted on said shaft with the uppermost portions thereof extending above the upper margins of said end portions of said frame member, and means for actuating said number wheels; and a casing assembly in which said frame is received, said casing assembly having a cover member with a top wall portion extending over the top of said frame member and side and end wall portions extending about the sides and ends of said frame member, the bottom and end portions of said frame member being dimensioned to provide a snug fit in said cover member, means detachably securing said cover member to said frame member, said top wall portion having a substantially planar upper surface and being comprised in its major part of a transparent synthetic plastic crystal member with a transparent window area generally centered therein and registering with said number wheels, said crystal member having a recess in the lower surface thereof substantially coinciding with said window area and receiving the uppermost portions of said number wheels to permit said number wheels to rotate in close proximity to the upper surface of said crystal member to provide a wide angle of sight, said window area having its margins disposed generally parallel to the corresponding margins of said top wall portion and spaced inwardly therefrom with the area therebetween being relatively opaque, light colored material on said crystal member conspicuously outlining the margins of said window area and relatively dark and relatively opaque material on said crystal member between said light colored material and the margins of the crystal member cooperating to provide a target frame about the window area and the portion of said number wheels visible through said window area for directing the eye of a reader to the numbers for rapid and accurate reading, said side and end wall portions of said cover member having inwardly projecting flange portions adjacent their upper edges, the margins of said crystal having outwardly projecting flange portions adjacent the inner surface thereof for engagement with the flange portions on said side and end wall portions of said cover member to limit the upward movement of said crystal member with respect to said cover member, said end portions of said frame member supporting said crystal member upwardly with the flange portions thereof in locking engagement with the flange portions of said side and end walls, and a crystal retaining member engaged frictionally with the wall portions of said cover member adjacent the upper edges thereof to give support to said crystal member, said crystal retaining member having an aperture therein generally coinciding with said window area.

References Cited by the Examiner
UNITED STATES PATENTS

| | | | |
|---|---|---|---|
| 489,703 | 1/1893 | Balzer | 235—1.5 |
| 1,570,021 | 1/1926 | Whittington | 235—96 |
| 2,046,810 | 7/1936 | Cannon | 235—1.5 |
| 2,372,650 | 4/1945 | Bliss | 235—1.5 |
| 2,541,161 | 2/1951 | Harper | 235—1.5 |
| 2,636,680 | 4/1953 | Summers | 235—1.5 |
| 2,998,187 | 4/1961 | Wollar | 235—1.5 |

RICHARD B. WILKINSON, *Primary Examiner.*

LEO SMILOW, *Examiner.*

STEPHEN J. TOMSKY, *Assistant Examiner.*